UNITED STATES PATENT OFFICE.

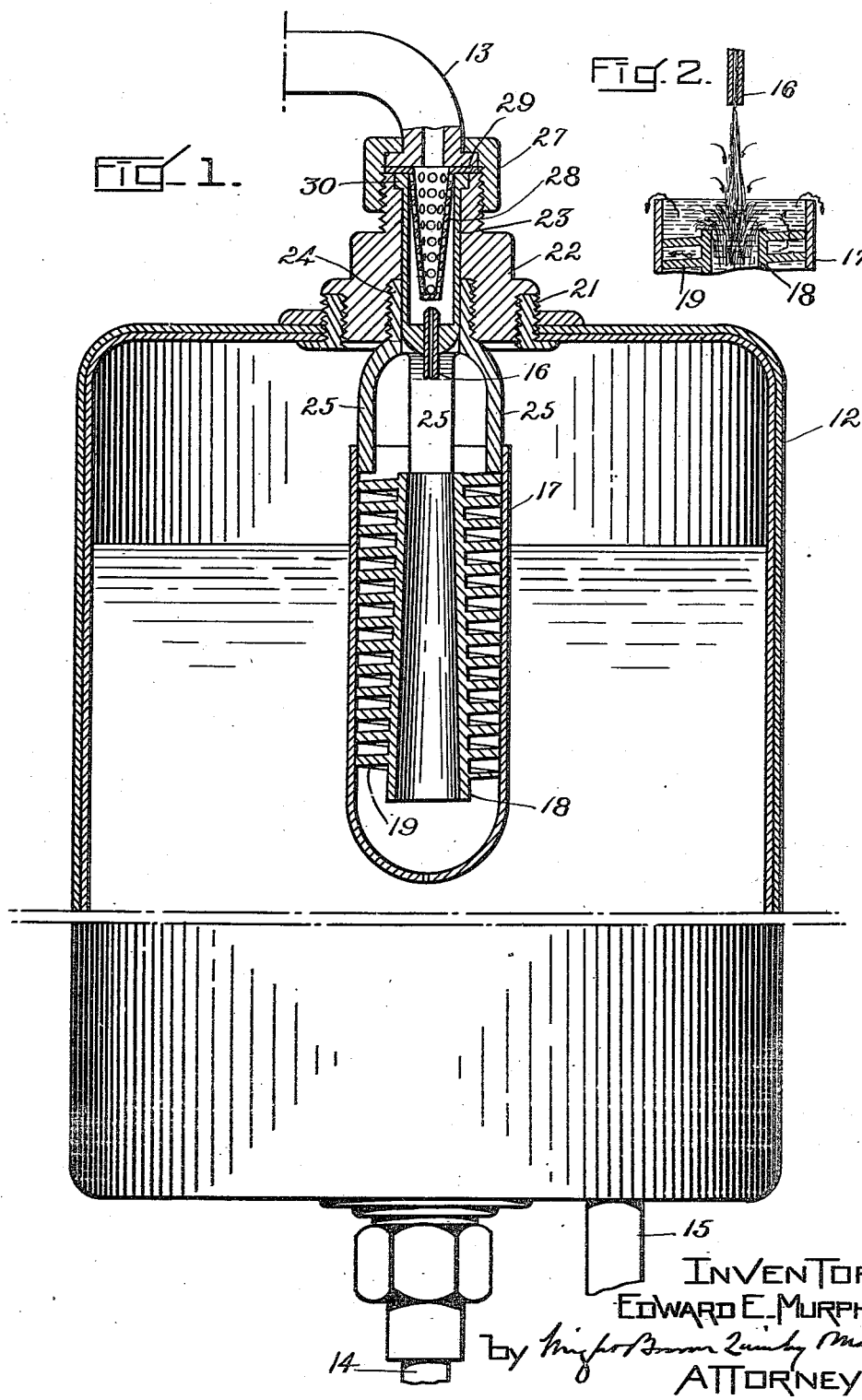

EDWARD E. MURPHY, OF WINCHESTER, MASSACHUSETTS.

MIXING MEANS FOR CARBONATING APPARATUS.

1,272,299.  Specification of Letters Patent.  Patented July 9, 1918.

Application filed May 5, 1917. Serial No. 166,733.

*To all whom it may concern:*

Be it known that I, EDWARD E. MURPHY, a citizen of the United States, residing at Winchester, in the county of Middlesex and State of Massachusetts, have invented new and useful Improvements in Mixing Means for Carbonating Apparatus, of which the following is a specification.

This invention relates to apparatus for charging water with carbonic-acid, or other gas, the apparatus including a closed tank having separate water and gas inlets and an outlet at which the discharged liquid is dispensed.

It is the usual practice to maintain the level of the accumulation of water in the tank below the top of the tank so that the water admitted through an inlet in the top, first enters a gas space above the water.

My invention is embodied in improved means, hereinafter described and claimed, for mixing the entering water with gas drawn from said gas space, and entrained by the water.

Of the accompanying drawings, forming a part of this specification,—

Figure 1 is a vertical section of the upper portion of a carbonating tank having mixing means embodying my invention.

Fig. 2 is a fragmentary sectional view illustrating the mixing action.

The same reference characters indicate the same parts in all of the figures.

In the drawings,—12 represents a carbonating tank supplied with water through a conduit 13 entering the top of the tank, and with gas through a conduit 14 entering the bottom of the tank. The tank is provided with a dispensing outlet at 15. A gage tube (not shown) usually accompanies the tank, to indicate the height of the accumulation of water therein, it being necessary to maintain a considerable gas space above the water.

The water-supply conduit 13 includes a contracted nozzle 16, adapted and arranged to direct a jet of water downwardly from the top of the tank, the nozzle being of smaller diameter than the diameter of the conduit 13, so that the jet is forcibly discharged. Supported below the nozzle 16 in position to receive the jet, is a mixing-cup 17, which is preferably cylindrical and has a closed bottom and an open top. The diameter of the cup is considerably greater than the maximum diameter or spread of the water jet, and its axis is in alinement with the nozzle, so that the jet entering the cup forms a flow current which impinges on the bottom of the cup, and is deflected backwardly thereby, forming an upwardly directed return current, surrounding the flow current, the effluent flowing in a thin sheet over the horizontal upper end of the cup and downwardly to the accumulation of water.

The upper end of the cup is spaced from the top of the tank and is in free communication with the gas space therein, so that the jet, moving rapidly through the gas space between the nozzle and the cup, induces a flow of gas toward the jet, as indicated by the arrows in Fig. 2, the gas contacting with the jet being entrained by the water and carried by said flow and return currents to the bottom and back to the top of the cup. The water and gas are thus held intimately associated for a period determined by the speed of the jet and the length of the cup, during which period much of the gas is absorbed by the water. To protract the period of association, I preferably provide the cup with means for deflecting and elongating the return current, said means preferably including a vertical open-ended tube or flow-current conduit 18, coaxial with the cup and formed to conduct the flow-current nearly to the bottom of the cup, the said conduit being separated from the wall of the cup by an annular space constituting a return conduit extending from the bottom to the upper end of the cup. In said return conduit is a helical baffle-plate 19, preferably formed as a helical flange on the flow-conduit 18, and contacting with the inner surface of the cup to form a helical duct through which the return current of water and entrained gas flows in a helical path to the top of the cup, where the effluent overflows into the accumulation of water in the tank. By thus elongating the return-current, the absorption of the entrained gas by the water is greatly facilitated.

The cup 17 is preferably connected removably with the top of the tank, and with the delivering end of the water-conduit 13 by the means next described.

An opening is formed in the top and is surrounded by an internally threaded collar 21, suitably secured to the top. An externally threaded annular bushing 22 is engaged with the internal thread of the collar 21, and contains a tubular conduit section 23, the lower end of which has a contracted bore containing the nozzle 16.

The bushing 22 is provided with an internally threaded socket with which is engaged an externally threaded annular shank 24, having depending arms 25, attached to the cup 17, said shank and arms constituting an open hanger which supports the cup and is located in the gas space, so that gas passes freely between the hanger arms to the jet delivered by the nozzle 16, the effluent flowing freely between said arms. The upper end of the bushing 22 has a reduced externally threaded extension engaging an internally threaded flanged coupling-nut 27, the flange of which engages a flange on the conduit portion 13. 28 represents a strainer having a flange 29 bearing on the upper end of the conduit section 23. The section 23 and the strainer 28 may be removably engaged with the bushing 22, the said section having a flange 30 bearing on a shoulder in the bushing. The cup 17 and bushing 22 are insertible and removable as one part, the cup and hanger being of smaller diameter than the bushing and the opening in the collar 21 and adapted to pass through said opening.

I claim:

1. A carbonating apparatus comprising a tank having a contracted water inlet arranged to direct a jet of water downwardly from the top of the tank, a fixed jet-receiving cup closed at its lower end and having an open upper end communicating with a gas space above an accumulation of water in the tank, a central flow conduit in the cup arranged in the path of said jet, to receive the jet and gas moving therewith, and separated from the wall of the cup by an annular space forming a return conduit, and means in said return conduit for deflecting and elongating a current of water and gas flowing upwardly therethrough.

2. A carbonating apparatus comprising a tank having a contracted water inlet arranged to direct a jet of water downwardly from the top of the tank, a fixed jet-receiving cup closed at its lower end and having an open upper end communicating with a gas space above an accumulation of water in the tank, a central flow conduit in the cup arranged in the path of said jet, to receive the jet and gas moving therewith, and separated from the wall of the cup by an annular space forming a return conduit, and a helical current-deflecting and elongating flange in said return conduit adapted to guide upwardly flowing water and gas in a helical path.

3. A carbonating apparatus comprising a tank having an opening in its top, an annular bushing detachably secured in said opening having means at its upper end for connection with a conduit member, a contracted nozzle supported by said bushing and adapted to direct a jet of water downwardly into the tank, a hanger attached to and depending from said bushing and a fixed jet-receiving mixing-cup supported by said hanger, and having an open upper end communicating with a gas space above an accumulation of water in the tank, the cup being adapted to cause an entrainment of gas by the water entering the cup, the hanger and cup being of smaller diameter than said opening and bushing, and insertible and removable with the bushing.

4. A carbonating apparatus comprising a tank having an opening in its top, an annular bushing detachably secured in said opening, and having means at its upper end for connection with a conduit member, a thimble occupying the bore of said bushing and forming another conduit member extending through the bushing, said thimble having a contracted nozzle at its lower end, adapted to direct a jet of water downwardly into the tank, a hanger attached to and depending from said bushing, and a fixed jet-receiving mixing-cup supported by said hanger, and having an open upper end communicating with a gas space above an accumulation of water in the tank, the cup being adapted to cause an entrainment of gas by the water entering the cup, the hanger and cup being of smaller diameter than said opening and bushing, and insertible and removable with the bushing.

In testimony whereof I have affixed my signature.

EDWARD E. MURPHY.